United States Patent Office 3,351,697
Patented Nov. 7, 1967

3,351,697
STRETCHING OF POLYMER FOILS
Walter Hufnagel, Forchheim, Upper Franconia, and Zoltan Doboczky, Eggolsheim, Germany, assignors to Lever Brothers Company, New York, N.Y., a corporation of Maine
Filed July 6, 1964, Ser. No. 380,546
Claims priority, application Germany, July 9, 1963, F 40,191
6 Claims. (Cl. 264—288)

This invention relates to a process and apparatus for the continuous stretching and elongation of synthetic polymer films by passing the films over rolls and rollers.

It is generally known that when polymer films are stretched or elongated within their thermoelastic range their mechanical and physical properties can be improved considerably as a result of the orientation of the molecules of the polymer which takes place. Thus, for example, longitudinal or transverse stretching of this nature greatly increases the tensile strength in the directions in which the pull is exerted. Other properties are also altered to advantage by stretching the polymer film. For example gloss and transparency are enhanced. Similarly resistance to low temperatures can be improved by stretching while, on the other hand, at a raised temperature stretched films have the shrinking properties desired in certain cases. The physical and chemical properties, such as impermeability by water vapour, gas and aroma, and also to a certain extent the electrical properties are likewise enhanced by stretching.

However, stretching also has special commercial significance for, with the same amount of starting material, it increases the effective area of the film, while reducing its thickness and maintaining or even improving its mechanical properties.

This factor has attained great importance in the packaging industry because in this case particularly it is essential for polymer films to be produced economically if they are to compete with the conventional packaging materials such as paper, parchment, aluminium foil and the like.

Various processes are already known for stretching polymer films, e.g. the clamp and roller stretching processes.

In clamp stretching the polymer film manufactured by extrusion from a calender or extruder slot or which has been previously manufactured in this way and re-heated, is gripped at its two side edges by suitable holders. As these holders move outwards simultaneously with their forward movement, the film held between them is stretched. However, in practice it has been found that this method has the disadvantage of not stretching the film uniformly over its entire width. The web of film is stretched more in the centre than at the edges, because it cools more quickly in this region on account of its contact with the holders. In addition, the pressure of the holders frequently leaves marks on the edges of the film. Consequently, the deformed edges have to be trimmed off as waste. Uneven stretching causes variations in the thickness of the film. It is thinner in the centre of the web than at the edges. In order to obtain films of uniform thickness over their whole width it is necessary to trim off further relatively broad edges as waste. This known process is therefore extremely uneconomic.

In roller stretching, the polymer film emerging from a calender or extruder slot, or previously manufactured preheated polymer film coming off a delivery roll, is passed over rollers which are driven at differing peripheral speeds and if necessary also in opposite directions. According to a known process the film to be stretched is looped round a driven feed roller, against which it is pressed by a bearing roll, and is then passed to a second roller which is rotated in the opposite direction but at a greater peripheral speed. The diameters of the rollers is of no consequence, in principle, and is usually between 70 and 150 mm., but driven rollers with a diameter of 25 mm. are also mentioned. The free length of film between the two rollers is stretched as a result of the pull exerted upon it. Elongation of this known type does, it is true, increase the effective area, but this is at the expense of the thickness and width of the film. The film is greatly narrowed, the degree of narrowing increasing with the distance between the surfaces of the two rollers.

Another process was therefore proposed in which two driven rollers rotate in opposite directions and at different peripheral speeds, the distance between the surfaces being as small as possible. The film to be stretched is looped round both the driven rollers and at the same time is pressed against them by pressure rolls. In spite of the short distance between the surfaces narrowing or "necking in" of the film is unavoidable. As stretching is very sudden and takes place over a very narrow area of film, the film is often torn. Furthermore, in the case of this known process the thickness of the film is not uniform over the whole width of the web. The stretched web of film is thicker over broad side areas than it is in the centre. If the film is trimmed only a narrow central strip of uniform thickness is obtained, so that there is a lot of waste. This process is not therefore very economic.

In order to overcome this undesirable loss of width of the film, another method was used in which the film was passed over one or more stretching cylinders situated between driven rollers rotating at different peripheral speeds. The stretching cylinder is profiled and roughened in order to increase adhesion of the film. The diameter of the fixed stretching cylinder is usually a multiple of that of the driven rollers. This does, it is true, slightly reduce the loss in width but at the same time the film is mechanically damaged by the roughened cylinder and becomes streaky. This process is therefore not suitable for producing transparent films.

Now it is also known to arrange between two driven rollers a suitable number of idler rolls about which the film, being looped round them, is conveyed to that roller which is driven at the higher peripheral speed. In the known devices of this type the driven rollers and the idler rolls are usually of the same diameter. Rollers or rolls with a diameter of between 70 and 150 mm. are normally used. However, it has been found that severe "necking in" of the film during stretching is unavoidable with this process, even if the distance between the surfaces of the adjacent rollers, whether driven or not driven, is kept as small as possible. As a result of the transverse shrinkage the edges of the web of film become uneven and the web loses much of its original width. Films stretched by this known process are sometimes less thick in the centre of the web than at the edges. Wide edges therefore have to be cut off in order to get a film web of uniform thickness over the whole width of the web. Thus this process is also uneconomic on account of the considerable waste due to trimming.

With the aid of the present invention it is possible to stretch a web of film consisting of synthetic polymers uniformly over almost its whole width without great reduction of width and without it being necessary to trim off wide edges, so that the stretched web of film is of uniform thickness over practically its whole width.

The process according to the invention for the continuous stretching and elongation of synthetic polymer films consists in that the films are passed over at least two driven rollers rotating at different peripheral speeds and over idler rolls arranged between them, the distinctive feature being that the diameter of these idler rolls is less than 40 mm., and preferably between 15 and 35 mm.

Whereas when stretching is effected by the known methods by means of rollers or rolls with diameters usually between 70 and 150 mm. severe "necking in" occurs as already described above, it has been found that in the process according to the invention reduction in width of the film occurs to only a very slight extent if, during the stretching process, the web of film is passed over a suitable number of idler rolls with a diameter of less than 40 mm. It has also been found that the distance between the surfaces of the slowly driven feed roller and the first idler roll and that between the last idler roll and the faster driven discharge roller does not affect the stretching process and can be chosen at will. Again it has been found that the distance between the surfaces of the idler rolls can be relatively large without having any appreciable effect on minimisation of reduction in width of the film. It can, for example, be ten times the thickness of the unstretched film.

In the method according to the invention the film to be stretched is passed over a slowly driven feed roller, the diameter of this and the distance between its surface and the surface of the first adjacent idler roll with a diameter of less than 40 mm. being variable within wide limits, and is then looped round a series of idler rolls with a diameter of less than 40 mm. arranged one after the other, in any desired sequence and in one or more rows, and is finally passed over a fast discharge roller driven at a speed corresponding to the stretching ratio desired.

The number of idler rolls with a diameter of less than 40 mm. should be such that, depending on the speed and degree of stretching, the last idler roll rotates at a different peripheral speed from that of the discharge roller driven at a higher peripheral speed. It is advisable to use multiple idler rolls when high stretching speeds are employed because in this case a high heating capacity has to be provided. Whereas the driven rollers are not normally heated, at least some of the idler rolls are heated to a temperature suited to the film to be stretched. If necessary the individual successive rolls are heated to different temperatures. Care must be taken to ensure that, as for as possible, the temperature of the idler rolls is kept constant by suitable automatic regulators. Any suitable means may be used for heating the rolls, e.g. steam, circulation heating, electrical power and the like.

It has proved beneficial for the heated idler rolls to be followed by other idler rolls which are unheated. These can also be cooled by known means if necessary.

It is an advantage to control, by suitable known means, the peripheral speed of the idler rolls which increases linearly from roll to roll, because it has been found that in this way the process according to the invention can be still further improved. It is also necessary to provide a means of adjusting the position of the individual idler rolls in relation to one another. By this means the areas of film to be stretched which are in contact with the idler rolls can be altered and by adjusting the position of the rolls in relation to one another it is possible to set the most favourable loop angle in accordance with the coefficient of friction of the film to be stretched.

As the width of the original film is almost completely retained, the film is stretched not only lengthwise but also, to a lesser extent, transversely; it thus possesses, as it were, biaxial orientation, longitudinal orientation being substantially predominant. However, as the mechanical properties of a film, e.g. its tensile strength and tensile elongation, alter with the degree or orientation, these mechanical values will also be altered, or rather improved, in the transverse direction. This fact is particularly important for the longitudinal stretching of crystalline polymer films, e.g. polyethylene films for, whereas after stretching only in the longitudinal direction these have substantially improved mechanical values in the longitudinal direction, the values in the transverse direction are greatly reduced. For example, a polyethylene film freely stretched lengthwise has tensile strenth values in the longitudinal direction which may amount to a multiple of those of the original film, depending on the degree of stretching, while on the other hand the tensile strength values in the transverse direction are considerably reduced, so that the film splits very readily and is unsuitable for many uses. A film like this cannot be subjected to any subsequent transverse stretching, as it splits at the slightest pull in this direction. When stretched over rolls by the method according to the invention, however, the film also acquires enhanced values for mechanical properties in the transverse direction, e.g. tensile strength, so that longitudinal splitting is considerably reduced. This can be further reduced, particularly in the case of crystalline polymer films, if the film is chilled, i.e. prevented from crystallising, directly after the stretching opposition. This can be easily done by cooling the rolls which directly follow the heated rolls, thus chilling the film.

The process according to the inventoin is suitable for stretching the most diverse synthetic polymer films, e.g. those made of polyvinyl chloride, polyvinylidene chloride, high pressure polyethylene, low pressure polyethylene, polypropylene, polycarbonates, polyesters, polyamides, mixed polymerides and the like.

Figure 1:
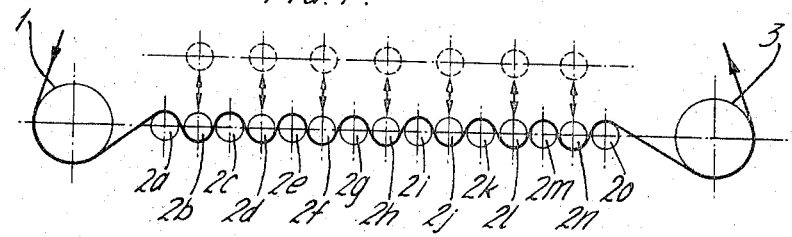
FIG. 1 is a diagrammatic representation in side elevation of apparatus according to the present invention.

Referring to FIG. 1, the driven feed roller 1 the idler rolls 2 with a diameter of less than 40 mm. and the driven discharge roller 3 are mounted in a roller frame which is not illustrated. In the diagram the idler rolls 2a–2o are arranged, by way of example, one behind the other in a single row. The distances between the driven feed roller 1 and the first adjacent idler roller 2a and that between the last idler roll 2o and the driven discharge roller 3 are variable within considerable limits. The feed roller 1 and the discharge roller 3 are both driven separately at an infinitely variable speed by conventional devices not illustrated, the peripheral speed of the feed roller 1 being lower than that of the discharge roller 3. Some of the idler rolls 2, for example rolls 2a to 2k, may be heated by known apparatus not illustrated, the subsequent rolls 2l–2o not being heated or, in certain cases, even cooled. Adjustable automatic regulators of a known type, not illustrated, ensure that the individual idler rolls 2 are kept at a constant desired temperature, which may vary from one roll to the next. The idler rolls 2 are fitted alternately in fixed and adjustable supports. It is thus possible to increase or decrease at will the distance between the surfaces and the position of the individual idler rolls in relation to one another, and also to arrange them in two rows side by side, as indicated in the drawing by a broken line. By altering the positions the most favourable loop can be set. Finally, the device is also fitted with known appliances by means of which the peripheral speed of each of the idler rolls 2 can be independently reduced within certain suitable ranges.

With the apparatus described a polymer film can be stretched as soon as it leaves a calender or an extruder slot. However, it is also possible to stretch a film that has already been manufactured and is wound on a delivery roll. The film is passed over the slowly driven feed roller 1 and in zigzag fashion over the idler rolls 2a–2o to the faster discharge roller 3. While passing over the idler rolls 2a–2o the film is continuously stretched without much reduction in width, the entire width of the web exhibiting a uniform thickness. Only very slight trimming of the edges is necessary.

The advantages of the invention are demonstrated with the aid of four examples I–IV given in the following table. In all the experiments a polymer film was stretched by the roller method in the same stretching ratio of 1:2.5. The same polymer film was used in each case. The unstretched film has a starting width of 1000 mm. and a thickness of 58 microns. With the exception of the diameter of the rolls, which was different in each experiment, and the consequent difference in the peripheral speed of the rolls, the conditions of the four experiments were unvaried.

The table shows that the loss in width decreases as the diameter of the idler rolls used is reduced. It can also be seen that it is only when idler rolls having a diameter of less than 40 mm. are used that the process according to the invention begins to be advantageous, because when the useful width of stretched film is almost the same as the width of the unstretched film the amount of trimming waste is very small.

TABLE

|  | I | II | III | IV |
|---|---|---|---|---|
| Diameter of the idler rolls (mm.) | 150 | 70 | 40 | 35 |
| Distance between the surfaces (mm.) | 1 | 1 | 1 | 1 |
| Thickness of film before stretching (mm.) | 0.058 | 0.058 | 0.058 | 0.058 |
| Stretching ratio | 2.5 | 2.5 | 2.5 | 2.5 |
| Width of film before stretching (mm.) | 1,000 | 1,000 | 1,000 | 1,000 |
| Width of film after stretching (mm.) | 630 | 630 | 950 | 980 |
| Width of film after trimming (mm.) | 550 | 550 | 750 | 920 |
| Loss in width (percent) | 45 | 45 | 25 | 8 |

Figure 2:
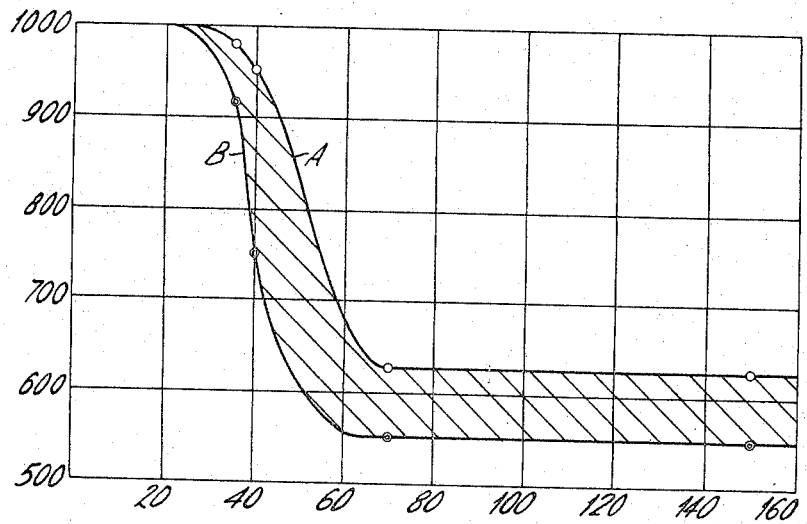
FIG. 2 is a graph showing the results of four experimental film-stretching operations in comparing the process of the invention with a known process.

The results of experiments I–IV are also illustrated in a graph which is FIG. 2 of the drawings. Here the widths of the film are shown on the ordinate and the diameter of the idler rolls on the abscissa. Curve A shows the values obtained for the widths of the untrimmed stretched films and Curve B the corresponding values after the necessary trimming. The amount which has to be cut off is determined by the width of the region in which the edges of the stretched film exhibit an uneven width and thickness.

The process according to the invention is thus extremely economical in comparison with the known processes, because from the same amount of polymer film a far larger area of useful stretched film can be produced in the same time, the amount of re-workable trimming waste being very small.

W claim:

1. Process for continuous stretching and elongation of synthetic polymer film, comprising the steps of continuously feeding a web of polymer film to a stretching zone at a pre-determined feed-in rate, roller-guiding the web over its full width to follow a zig-zag path through said stretching zone by a reverse turning of the web through multiple circular arcs of radius less than 20 mm., and withdrawing the web from said stretching zone, at a pre-determined rate which is greater than said feed-in rate.

2. Process for continuous stretching and elongation of synthetic polymer film, comprising the steps of continuously feeding a web of polymer film to a stretching zone at a pre-determined feed-in rate, roller-guiding the web over its full width to follow a zig-zag path through said stretching zone by reverse turning of the web through multiple circular arcs of radius between 7.5 and 17.5 mm., and withdrawing the web from said stretching zone at a pre-determined rate which is greater than said feed-in rate.

3. Process for continuous stretching and elongation of synthetic polymer film, comprising the steps of continuously feeding a web of polymer film to a stretching zone at a pre-determined feed-in rate, roller-guiding the web over its full width to follow a zig-zag path through said stretching zone by reverse turning of the web through multiple circular arcs of radius less than 20 mm., heating said web in at least a first portion of stretching zone, and withdrawing the web from said stretching zone at a pre-determined rate which is greater than said feed-in rate.

4. Process for continuous stretching and elongation of synthetic polymer film, comprising the steps of continuously feeding a web of polymer film to a stretching zone at a pre-determined feed-in rate, roller-guiding the web over its full width to follow a zig-zag path through said stretching zone by reverse turning of the web through multiple circular arcs of radius between 7.5 and 17.5 mm., heating said web in at least a first portion of said stretching zone, and withdrawing the web from said stretching zone at a pre-determined rate which is greater than said feed-in rate.

5. Process for continuous stretching and elongation of synthetic polymer film, comprising the steps of continuously feeding a web of polymer film to a stretching zone at a pre-determined feed-in rate, roller-guiding the web over its full width to follow a zig-zag path through said stretching zone by reverse turning of the web through multiple circular arcs of radius less than 20 mm., heating said web in a first portion of such stretching zone, cooling said web in a second portion of such stretching zone, and withdrawing the web from such stretching zone at a pre-determined rate which is greater than said feed-in rate.

6. Process for continuous stretching and elongation of synthetic polymer film, comprising the steps of continuously feeding a web of polymer film to a stretching zone at a pre-determined feed-in rate, roller-guiding the web over its full width to follow a zig-zag path through such stretching zone by reverse turning of the web through multiple circular arcs of radius between 7.5 and 17.5 mm., heating said web in a first portion of such stretching zone, cooling said web in a second portion of such stretching zone, and withdrawing the web from such stretching zone at a pre-determined rate which is greater than said feed-in rate.

References Cited

UNITED STATES PATENTS 2,767,435  10/1956  Alles _____ 264—288
2,823,421  2/1958  Scarlett _____ 264—288

FOREIGN PATENTS 972,226  10/1964  Great Britain.

ALEXANDER H. BRODMERKEL, *Primary Examiner.*

J. H. WOO, *Assistant Examiner.*